(12) United States Patent
Yang et al.

(10) Patent No.: US 11,064,059 B2
(45) Date of Patent: Jul. 13, 2021

(54) DATA TRANSMISSION METHOD AND COMMUNICATION DEVICE

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/605,174

(22) PCT Filed: Apr. 25, 2017

(86) PCT No.: PCT/CN2017/081838
§ 371 (c)(1),
(2) Date: Oct. 14, 2019

(87) PCT Pub. No.: WO2018/195770
PCT Pub. Date: Nov. 1, 2018

(65) Prior Publication Data
US 2021/0006644 A1    Jan. 7, 2021

(51) Int. Cl.
*H04L 29/06* (2006.01)
*H04L 12/823* (2013.01)
(Continued)

(52) U.S. Cl.
CPC ............ *H04L 69/28* (2013.01); *H04L 47/32* (2013.01); *H04W 28/0268* (2013.01); *H04W 80/00* (2013.01)

(58) Field of Classification Search
CPC ....... H04L 1/1877; H04L 47/10; H04L 47/14; H04L 47/30; H04L 1/0018; H04L 69/04;
(Continued)

(56) References Cited

U.S. PATENT DOCUMENTS 8,208,394 B2 * 6/2012 Ho ..................... H04L 47/14
370/252
8,325,608 B2   12/2012 Kumar et al.
(Continued)

FOREIGN PATENT DOCUMENTS

CN    101340390    1/2009
CN    102469511    5/2012
(Continued)

OTHER PUBLICATIONS

National Institute of Industrial Property of Chile, Chile First Office Action for CL201902937, dated Nov. 27, 2020.
(Continued)

*Primary Examiner* — Mewale A Ambaye
(74) *Attorney, Agent, or Firm* — Hodgson Russ LLP

(57) ABSTRACT

The present application discloses a method and a communication device for transmitting data, and the method includes: determining a type of a packet data convergence protocol service data unit PDCP SDU; determining a duration of a discard timer according to the type of the PDCP SDU; and processing the PDCP SDU or a data unit generated based on the PDCP SDU according to the discard timer.

11 Claims, 3 Drawing Sheets

200

Type of the PDCP SDU is determined — 210

Duration of discard timer is determined according to the type of the PDCP SDU — 220

PDCP SDU or data unit generated based on the PDCP SDU is processed according to the discard timer — 230

(51) Int. Cl.
*H04W 28/02* (2009.01)
*H04W 80/00* (2009.01)

(58) Field of Classification Search
CPC ......... H04W 28/0252; H04W 28/0268; H04W 72/044; H04W 72/04; H04W 28/14; H04W 28/0284; H04W 28/06; H04W 80/02

See application file for complete search history.

(56) References Cited

U.S. PATENT DOCUMENTS

| | | | |
|---|---|---|---|
| 8,804,742 B2 | 8/2014 | Kim et al. | |
| 2008/0205262 A1* | 8/2008 | Suzuki | H04Q 11/0062 370/216 |
| 2012/0039169 A1* | 2/2012 | Susitaival | H04W 28/12 370/230 |
| 2012/0195276 A1* | 8/2012 | Chun | H04L 47/30 370/329 |
| 2015/0180786 A1* | 6/2015 | Chen | H04L 1/0026 370/235 |
| 2015/0230125 A1* | 8/2015 | Chun | H04W 72/044 370/230 |
| 2015/0334697 A1* | 11/2015 | Song | H04W 68/005 455/450 |
| 2016/0277154 A1* | 9/2016 | Quan | H04L 47/34 |
| 2016/0352643 A1 | 12/2016 | Xiao et al. | |

FOREIGN PATENT DOCUMENTS

| | | |
|---|---|---|
| CN | 102742292 | 10/2012 |
| EP | 2086150 | 8/2009 |
| EP | 2667655 | 11/2013 |

OTHER PUBLICATIONS

CMCC, Huawei, Intel, "New WID on Further enhancements on Video for LTE", 3GPP TSG RAN Meeting #75, RP-170781, 4 pages, Mar. 6, 2017, Croatia.

European Patent Office, Search Report of Appl. No. EP17907718, dated Feb. 17, 2020.

INTEL Corporation, "Impact analysis of critical data discard on UL Video transmission", 3GPP Draft; R2-166583_Intel_Video_Solution, 3rd Generation Partnership Project (3GPP), Oct. 9, 2016.

WIPO, ISR for PCT/CN2017/081838, dated Dec. 29, 2017.

IPI, Office Action for in Application No. 201917044482, dated Jan. 29, 2021.

EPO, Communication for EP Application No. 17907718.5, dated Mar. 15, 2021.

* cited by examiner

200

Type of the PDCP SDU is determined ~ 210

Duration of discard timer is determined according to the type of the PDCP SDU ~ 220

PDCP SDU or data unit generated based on the PDCP SDU is processed according to the discard timer ~ 230

DATA TRANSMISSION METHOD AND COMMUNICATION DEVICE

CROSS-REFERENCE TO RELATED APPLICATION

This application is a U.S. national phase application of International Application No. PCT/CN2017/081838, filed Apr. 25, 2017, the entire disclosure of which is incorporated herein by reference.

TECHNICAL FIELD

Embodiments of the present application relate to the field of wireless communications, and more particularly, to a method and a communication device for transmitting data.

BACKGROUND

In the long term evolution (LTE) system, a packet data convergence protocol (PDCP) layer discards a PDCP service data unit (SDU) based on a discard timer. When a transmitter receives the PDCP SDU from an upper layer, the discard timer is started. When the discard timer expires and a user device still does not initiate transmission of the PDCP SDU, the PDCP SDU is discarded. If the discard timer is properly configured to meet quality of service (QoS) required by a radio bearer, the PDCP discard mode of the PDCP layer can prevent transition delay and queuing of the transmitter.

SUMMARY

An embodiment of the present application provides a method and a communication device for transmitting data.

In a first aspect, a method for transmitting data is provided, including: determining a type of a packet data convergence protocol service data unit PDCP SDU; determining a duration of a discard timer according to the type of the PDCP SDU; and processing the PDCP SDU or a data unit generated based on the PDCP SDU according to the discard timer.

Optionally, in an implementation manner of the first aspect, the processing the PDCP SDU or a data unit generated based on the PDCP SDU according to the discard timer includes: discarding the PDCP SDU or the data unit generated based on the PDCP SDU when the discard timer expires.

Optionally, in an implementation manner of the first aspect, the data unit generated based on the PDCP SDU includes: a protocol data unit PDCP PDU formed based on the PDCP SDU, or RLC SDU which has not started to be mapped to a radio link layer control protocol RLC PDU.

Optionally, in an implementation manner of the first aspect, types of the PDCP SDU include types of frames of the PDCP SDU or a service type of the PDCP SDU.

Optionally, in an implementation manner of the first aspect, types of the frames include any one of the following: an intra-frame, a forward predictive frame, and a bi-directional interpolated prediction frame.

Optionally, in an implementation manner of the first aspect, the duration of the discard timer corresponding to the intra-frame is greater than the duration of the discard timer corresponding to the forward predictive frame; the duration of the discard timer corresponding to the intra-frame is greater than the duration of the discard timer corresponding to the bi-directional interpolated prediction frame.

Optionally, in an implementation manner of the first aspect, the method is performed by a terminal device, and the determining a duration of a discard timer according to the type of the PDCP SDU includes: receiving, by the terminal device, a plurality of durations sent by a network device; and determining the duration of the discard timer according to the type of the PDCP SDU by the terminal device.

In a second aspect, a communication device is provided that can perform operations of the communication device in the first aspect or any alternative implementation manner of the first aspect described above. In particular, the communication device may comprise module units configured to perform the operations of the communication device in the first aspect or any alternative implementation manner of the first aspect described above.

In a third aspect, a communication device is provided, including: a processor, a transceiver, and a memory. Wherein, the processor, the transceiver, and the memory communicate with each other through internal connection paths. The memory is configured to store instructions, and the processor is configured to execute the instructions stored by the memory. When the processor executes the instructions stored by the memory, the executing causes the communication device to perform the method of the first aspect or any of the possible implementations of the first aspect, or the execution causes the communication device to implement the communication device provided by the third aspect.

In a fourth aspect, a computer readable storage medium is provided, and the computer readable storage medium stores a program causing a communication device to perform any of the methods for transmitting data in the first aspect and its various implementations described above.

In a fifth aspect, a system chip is provided, comprising an input interface, an output interface, a processor, and a memory. The processor is configured to execute an instruction stored by the memory, and when the instruction is executed, the processor can implement any of the methods for transmitting data in the first aspect and its various implementations described above.

DETAILED DESCRIPTION

Figures 1, 2:
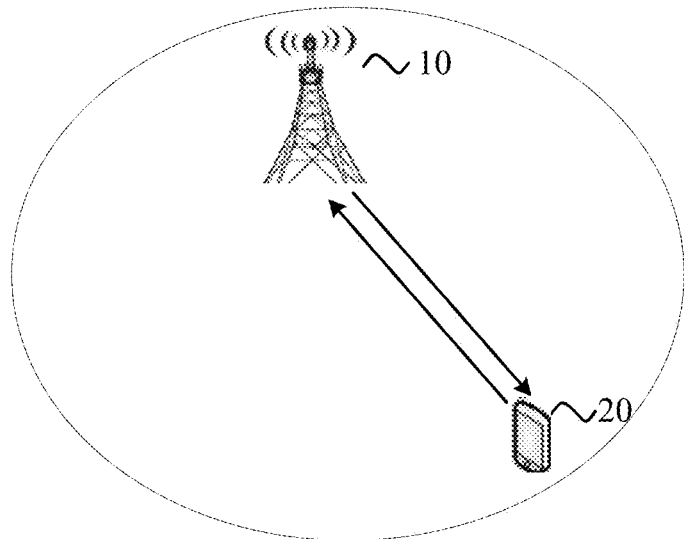
FIG. 1 is a schematic structural diagram of an application scenario of an embodiment of the present application.
FIG. 2 is a schematic flowchart of a method for transmitting data according to an embodiment of the present application.

The technical solutions in embodiments of the present application will be described below with reference to the accompanying drawings.

It should be understood that the technical solutions of the embodiments of the present application can be applied to various communication systems, such as a global system of mobile communication (GSM) system, a code division multiple access (CDMA) system, and a wideband code division multiple access (WCDMA) system, a long term evolution (LTE) system, a LTE frequency division duplex (FDD) system, a LTE time division duplex (TDD), an universal mobile telecommunication system (UMTS), and a future 5G communication systems.

A terminal device in the embodiment of the present application may also be referred to as a user equipment (UE), an access terminal, a subscriber unit, a subscriber station, a mobile station, a mobile station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with a wireless communication capability, a computing devices or other processing devices connected to wireless modems, an in-vehicle device, a wearable device, a terminal device in a future 5G networks, or a terminal device in a public land mobile network (PLMN) of a future evolution, etc.

The network device in the embodiment of the present application may be a device for communicating with the terminal device, for example, may be a base transceiver station (BTS) in the GSM system or the CDMA system, or a node base (NodeB, NB) in the WCDMA system. NB, or an evolutional node base (eNB or eNodeB) in the LTE system, or the network device may be a relay station, an access point, an in-vehicle device, a wearable device, and a network side device in a future 5G network or a network side device in a future evolutional PLMN network.

The types of the radio frames (hereinafter referred to as a frame) involved in the embodiment of the present application include at least an intra-frame (that is, a key frame, I frame), a forward predictive frame (that is, a predictive frame, P frame), and a bi-directional interpolated prediction frame (that is, a bi-directional prediction frame, B frame).

Among them, the I frame is usually a first frame constituting a group of picture (GOP), which is moderately compressed (coded) and used as a reference point for random access, and can be regarded as an image. The I frame can be seen as a product of an image through being compressed, which can be decompressed (decoded) into a single complete picture by a video decompression algorithm. The I frame retains all the information of a scene.

The P frame compresses the encoded image transmitting data amount based on the temporal redundancy information of the previous encoded frame in the image sequence, that is, a complete picture is generated by referring to the previous I frame or B frame. P frame stores only the difference from the previous decompressed picture.

The B frame considers both the previous encoded frame in the source image sequence and the temporal redundancy information between the encoded frames following the source image sequence to compress the encoded image transmitting data amount. The generation of the B frame needs to refer to its previous I frame or B frame, and the following P frame.

It can be seen that the I-frame contains more information than the P frame and the B-frame, and the wireless transmission system should give it a higher transmission priority. However, since the I-frame, the P frame, and the B-frame belong to the same radio bearer, they are processed by the same PDCP entity, which cannot meet the data transmission requirements based on different types of the frames.

In the embodiment of the present application, during processing, the different types of data units use different discard timers, that is, the different types of data units are configured to have different discard timers (hereinafter also referred to as timers), thereby meeting the transmission requirements of different types of data units.

FIG. 1 is a schematic diagram of an application scenario of an embodiment of the present application. A communication system in FIG. 1 may include a network device 10 and a terminal device 20. The network device 10 is configured to provide communication services for the terminal device 20 and access the core network. The terminal device 20 can access the network by searching for synchronization signals, broadcast signals, and the like transmitted by the network device 10, thereby performing communication with the network. Arrows shown in FIG. 1 may represent uplink/downlink transmissions by a cellular link between the terminal device 20 and the network device 10.

The network in the embodiment of the present application may refer to a public land mobile network (PLMN) or a device to device (D2D) network or a machine to machine/man (M2M) network or other networks. FIG. 1 is only a simplified schematic diagram of an example, and other terminal devices may also be included in the network, which are not shown in FIG. 1.

FIG. 2 is a schematic flowchart of a method 200 for transmitting data according to an embodiment of the present application. The method for transmitting data in FIG. 2 can be performed by a transmitting end, which can be, for example, the network device 10 or the terminal device 20 shown in FIG. 1.

The embodiments of the present application relate to a packet data convergence protocol (PDCP) layer and a radio link control (RLC) layer. Wherein, the RLC layer communicates with the PDCP layer through a service access point (SAP), and a service data unit (SDU) acquired by the PDCP layer is processed by the PDCP layer to form a protocol data unit (PDCP PDU), the data received by the RLC layer from the PDCP layer is called a PDCP PDU (or RLC SDU), and the RLC SDU received by the RLC layer from the PDCP layer is processed by the RLC layer to form an RLC PDU, and transmitted to the next layer.

As shown in FIG. 2, the specific process of transmitting data includes:

At 210, a type of the PDCP SDU is determined.

At 220, a duration of a discard timer is determined according to the type of the PDCP SDU.

At 230, the PDCP SDU or a data unit generated based on the PDCP SDU is processed according to the discard timer.

Specifically, the transmitting end determines the duration of the discard timer according to the obtained type of the PDCP SDU, so that the PDCP SDU or the data unit generated based on the PDCP SDU is processed according to the discard timer (that is, the duration).

In the prior art, when processing the different types of data units, the same timer duration (hereinafter also referred to as duration) is used to process the data units, which cannot meet the transmission requirements of different types of data units.

In the embodiment of the present application, the duration of the discard timer is determined by the type of the PDCP SDU, thereby meeting the transmission requirements of different types of data units.

Optionally, at 230, the processing the PDCP SDU or a data unit generated based on the PDCP SDU according to the discard timer includes: discarding the PDCP SDU or the data unit generated based on the PDCP SDU when the discard timer expires.

Wherein, optionally, the data unit generated based on the PDCP SDU includes: a PDCP PDU formed based on the PDCP SDU, or RLC SDU which has not started to be mapped to a RLC PDU.

Specifically, when the PDCP layer receives the PDCP SDU, the discard timer is started. When the discard timer expires, if the PDCP SDU is still located at the PDCP layer, the PDCP SDU is discarded, and if the PDCP SDU has been mapped to the PDCP PDU, the PDCP PDU is discarded; if the PDCP PDU is transmitted to the next layer (that is, the RLC layer), the RLC SDU is discarded when the discard timer expires. However, if the RLC SDU has begun to map to the RLC PDU, the PLC SDU is not discarded.

Optionally, the types of the PDCP SDU include a type of a frame of the PDCP SDU, a service type of the PDCP SDU, or a service priority of the PDCP SDU.

For example, if the service priority of the PDCP SDU is higher, the duration of the discard timer can be set longer; while if the service priority of the PDCP SDU is lower, and the duration of the discard timer can be set shorter.

For another example, if the service type of the PDCP SDU is a video, because the data amount of the video is generally large, the duration of the discard timer can be set longer. If the service type of the PDCP SDU is voice, the duration of the discard timer can be set shorter.

For another example, the types of the PDCP SDU frames may include any one of the following: an intra-frame (I-frame), a forward predictive frame (P-frame), and a bi-directional interpolated prediction frame (B-frame). Since the I-frame contains more information than P frame and B-frame, the duration of the discard timer corresponding to the I-frame is greater than the duration of the discard timer corresponding to the P-frame; the duration of the discard timer corresponding to the I-frame is greater than the duration of the discard timer corresponding to the B-frame. For example, the duration of the discard timer corresponding to the I-frame may be 300 ms, while the duration of the discard timer corresponding to the non-I-frame may be 100 ms.

For the I-frame, the transmitting end can wait for the duration of the corresponding discard timer in the buffer. In the case of poor radio channel quality, there can be a longer waiting time for low-rate or high-retransmission transmission of data units for the underlying layer.

For the P frame and the B-frame, since the shorter timer duration is adopted, it can be discarded in time in the case of poor radio channel quality, thereby reducing the transmission burden of the underlying layer.

Optionally, the method is performed by the terminal device. At 220, the determining a duration of a discard timer according to the type of the PDCP SDU includes: receiving, by the terminal device, a plurality of durations sent by a network device; and determining the duration of the discard timer according to the type of the PDCP SDU by the terminal device.

That is, if the transmitting end is a terminal device, the network device can inform the terminal device of the preset multiple timer durations in advance, and the terminal device determines the duration corresponding to the type of the PDCP SDU according to the type of the PDCP SDU and the correspondence between the multiple PDCP SDU types and the multiple timer durations, and sets the duration of the discard timer to this duration.

For example, the duration of the timer corresponding to the PDCP SDU of the I-frame is 300 ms; the duration of the discard timer corresponding to the non-I-frame (P frame and B-frame) is 100 ms. The terminal device selects an appropriate duration to set the timer according to the type of the frame of the PDCP SDU.

Figure 3:
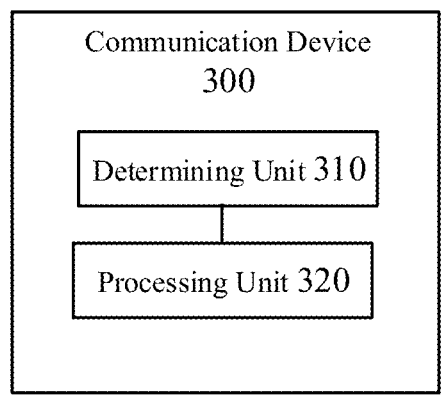
FIG. 3 is a schematic block diagram of a communication device according to an embodiment of the present application.

FIG. 3 is a schematic block diagram of a communication device 300 in accordance with an embodiment of the present application. The communication device can be a terminal device or a network device. As shown in FIG. 3, the communication device 300 includes a determining unit 310 and a processing unit 320. Wherein:

a determining unit 310 is configured to determine a type of a packet data convergence protocol service data unit PDCP SDU;

the determining unit 310 is further configured to determine a duration of a discard timer according to the type of the PDCP SDU;

the processing unit 320 is configured to process the PDCP SDU or a data unit generated based on the PDCP SDU according to the discard timer.

Therefore, the transmitting end determines the duration of the discard timer by the type of the PDCP SDU, thereby meeting the transmission requirements of different types of data units.

Optionally, the processing unit 320 is specifically configured to discard the PDCP SDU or the data unit generated based on the PDCP SDU when the discard timer expires.

Optionally, the data unit generated based on the PDCP SDU includes: a protocol data unit PDCP PDU formed based on the PDCP SDU, or RLC SDU which has not started to be mapped to a radio link layer control protocol RLC PDU.

Optionally, the types of the PDCP SDU include a type of a frame of the PDCP SDU or a service type of the PDCP SDU.

Optionally, the types of the frames include any one of the following: an intra-frame, a forward predictive frame, and a bi-directional interpolated prediction frame.

Optionally, the duration of the discard timer corresponding to the intra-frame is greater than the duration of the discard timer corresponding to the forward predictive frame; the duration of the discard timer corresponding to the intra-frame is greater than the duration of the discard timer corresponding to the bi-directional interpolated prediction frame.

Optionally, the communication device includes a terminal device, and the terminal device further includes a receiving unit, configured to receive a plurality of durations sent by the network device before determining the duration of the discard timer according to the type of the PDCP SDU by the determining unit 310. The determining unit 310 is specifically configured to determine a duration of the discard timer in the multiple durations according to the type of the PDCP SDU.

Figure 4:
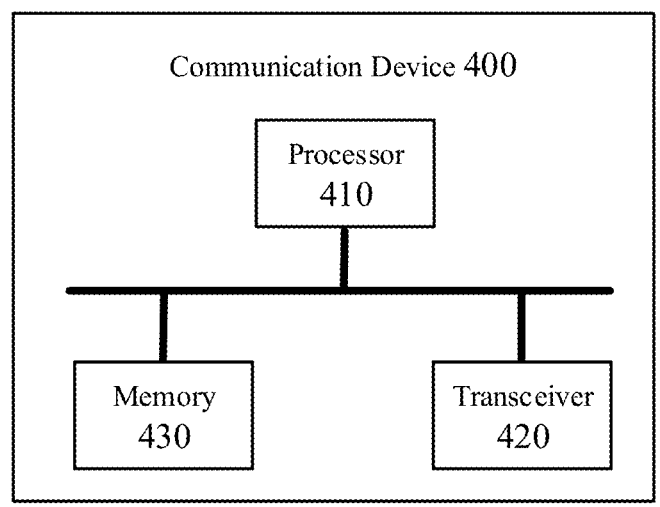
FIG. 4 is a schematic structural diagram of a communication device according to an embodiment of the present application.

FIG. 4 is a schematic structural diagram of a communication device 400 according to an embodiment of the present application. The communication device can be a terminal device or a network device. As shown in FIG. 4, the communication device includes a processor 410, a transceiver 420, and a memory 430, wherein the processor 410, the transceiver 420, and the memory 430 communicate with each other through internal connection paths. The memory 430 is configured to store instructions, and the processor 410 is configured to execute the instructions stored by the memory 430 to control the transceiver 420 to receive signals or transmit signals.

Wherein, the processor 410 is configured to: determine a type of a packet data convergence protocol service data unit (PDCP SDU); determine a duration of a discard timer according to the type of the PDCP SDU, and process the PDCP SDU or a data unit generated based on the PDCP SDU according to the discard timer.

Therefore, the transmitting end determines the duration of the discard timer by the type of the PDCP SDU, thereby meeting the transmission requirements of different types of data units.

Optionally, the processor 410 is specifically configured to discard the PDCP SDU or the data unit generated based on the PDCP SDU when the discard timer expires.

Optionally, the data unit generated based on the PDCP SDU includes: a protocol data unit PDCP PDU formed based on the PDCP SDU, or RLC SDU which has not started to be mapped to a radio link layer control protocol RLC PDU.

Optionally, the types of the PDCP SDU include a type of a frame of the PDCP SDU or a service type of the PDCP SDU.

Optionally, the types of the frames include any one of the following: an intra-frame, a forward predictive frame, and a bi-directional interpolated prediction frame.

Optionally, the duration of the discard timer corresponding to the intra-frame is greater than the duration of the discard timer corresponding to the forward predictive frame; the duration of the discard timer corresponding to the intra-frame is greater than the duration of the discard timer corresponding to the bi-directional interpolated prediction frame.

Optionally, the communication device includes a terminal device, and the transceiver 420 is configured to: receive a plurality of durations sent by the network device before determining the duration of the discard timer according to the type of the PDCP SDU by the processor 410. The processor 410 is specifically configured to determine a duration of the discard timer in the multiple durations according to the type of the PDCP SDU.

It should be understood that in the embodiment of the present application, the processor 410 may be a central processing unit (CPU), and the processor 410 can also be other general purpose processors, digital signal processors (DSPs), application specific integrated circuits (ASICs), field programmable gate arrays (FPGAs) or other programmable logic devices, discrete gates or transistor logic devices, discrete hardware components, etc. The general purpose processor may be a microprocessor can also be any conventional processor, etc.

The memory 430 can include a read only memory and a random access memory and provides instructions and data to the processor 410. A portion of the memory 430 may also include a non-volatile random access memory. For example, the memory 430 can also store information of the device type.

In the implementation process, each step of the foregoing method may be completed by an integrated logic circuit of hardware in the processor 410 or an instruction in a form of software. The steps of the method disclosed in the embodiment of the present application may be directly implemented by the hardware processor, or may be performed by a combination of hardware and software modules in the processor 410. The software module can be located in a conventional storage medium such as a random access memory, a flash memory, a read only memory, a programmable read only memory or an electrically erasable programmable memory, a register, and the like. The storage medium is located in the memory 430, and the processor 410 reads the information in the memory 430 and completes the steps of the above method in combination with its hardware. To avoid repetition, it will not be described in detail here.

The communication device 400 according to an embodiment of the present application may correspond to the communication device for performing the method 200 in the above method 200, and the communication device 300 according to an embodiment of the present application, and each unit or module in the communication device 400 is used to perform each action or process performed by the communication device in the above method 200. Here, in order to avoid redundancy, detailed description thereof is omitted.

Figure 5:
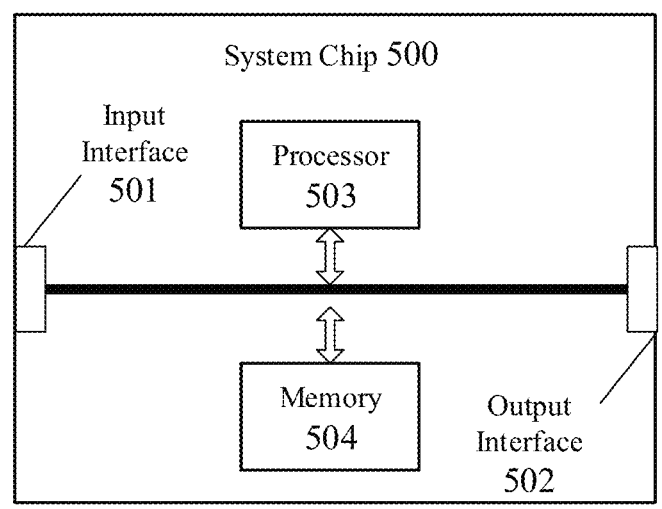
FIG. 5 is a schematic structural diagram of a system chip according to an embodiment of the present application.

FIG. 5 is a schematic structural diagram of a system chip according to an embodiment of the present application. The system chip 500 of FIG. 5 includes an input interface 501, an output interface 502, at least one processor 503, and a memory 504. The input interface 501, the output interface 502, the processor 503, and the memory 504 are interconnected by internal connection paths. The processor 503 is configured to execute code in the memory 504. When the code is executed, the processor 503 can implement the method 200 performed by the communication device in a method embodiment. For the sake of brevity, it will not be repeated here.

Those ordinary skilled in the art will appreciate that the exemplary units and the steps of the algorithm described in connection with the embodiments disclosed herein can be implemented in electronic hardware or a combination of computer software and electronic hardware. Whether these functions are performed in hardware or software depends on the specific application and design constraints of the technical solution. A skilled person can use different methods to implement the described functionality for each particular application, but such implementation should not be considered beyond the scope of this application.

A skilled person in the art can clearly understand that for the convenience and brevity of the description, the specific working process of the system, the device and the unit described above can refer to the corresponding process in the foregoing method embodiment, and details are not described herein again.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be another division manner, for example, multiple units or components may be combined or may be integrated into another system, or some features can be ignored or not executed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components of the displayed units may or may not be physical units, that is, may be located in one place, or may be distributed to multiple network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit.

This functionality, if implemented as a software functional unit and sold or used as a standalone product, can be stored on a computer readable storage medium. Based on such understanding, the technical solution of the present application or the part contributing to the prior art or the part of the technical solution may be embodied in the form of a software product, which is stored in a storage medium, including instructions to cause a computer device (which may be a personal computer, a server, or a network device, etc.) to perform all or part of the steps of the method of various embodiments of the present application. The foregoing storage medium includes: a U disk, a mobile hard disk, a read-only memory (ROM), a random access memory (RAM), a magnetic disk, or an optical disk, and the like, which can store program code.

The above is only a specific embodiment of the present application, but the protection scope of the embodiments of the present application is not limited thereto, and any person skilled in the art can easily think of changes or replacements within the technical scope disclosed in the embodiments of the present application, which should be covered in the scope of protection of this application. Therefore, the scope of protection of the embodiments of the present application should be determined by the protection scope of the claims.

What is claimed is:

1. A method for transmitting data by a communication device, the method comprising:
   determining a type of a packet data convergence protocol service data unit (PDCP SDU);
   determining a duration of a discard timer according to the type of the PDCP SDU; and
   processing the PDCP SDU or a data unit generated based on the PDCP SDU according to the discard timer,
   wherein the type of the PDCP SDU comprises a type of a frame of the PDCP SDU or a service type of the PDCP SDU,
   wherein the type of the frame comprises any one of the following: an intra-frame, a forward predictive frame, and a bi-directional interpolated prediction frame, and
   wherein the duration of the discard timer corresponding to the intra-frame is greater than the duration of the discard timer corresponding to the forward predictive frame; and the duration of the discard timer corresponding to the intra-frame is greater than the duration of the discard timer corresponding to the bi-directional interpolated prediction frame.

2. The method according to claim 1, wherein the processing the PDCP SDU or the data unit generated based on the PDCP SDU according to the discard timer comprises:
   discarding the PDCP SDU or the data unit generated based on the PDCP SDU when the discard timer expires.

3. The method according to claim 1, wherein the data unit generated based on the PDCP SDU comprises one of the following: a packet data convergence protocol data unit (PDCP DU) formed based on the PDCP SDU; and
   a radio link layer control protocol service data unit (RLCP SDU) which has not started to be mapped to the radio link layer control protocol data unit RLC PDU.

4. The method according to claim 1, wherein the method is performed by a terminal device, and the determining the duration of the discard timer according to the type of the PDCP SDU comprises:
   receiving, by the terminal device, a plurality of durations sent by a network device; and
   determining the duration of the discard timer according to the type of the PDCP SDU by the terminal device.

5. A communication device, comprising: a processor, a transceiver, and a memory, wherein, the processor, the transceiver, and the memory communicate with each other through internal connection paths, the memory is configured to store instructions, and the processor is configured to execute the instructions stored by the memory,
   the processor is configured to determine a type of a packet data convergence protocol service data unit (PDCP SDU);
   the processor is further configured to determine a duration of a discard timer according to the type of the PDCP SDU; and
   the processor is configured to process the PDCP SDU or a data unit generated based on the PDCP SDU according to the discard timer,
   wherein the type of the PDCP SDU comprises one of the following: a type of a frame of the PDCP SDU and a service type of the PDCP SDU,
   wherein the type of the frame comprises any one of the following: an intra-frame, a forward predictive frame, and a bi-directional interpolated prediction frame, and
   wherein the duration of the discard timer corresponding to the intra-frame is greater than the duration of the discard timer corresponding to the forward predictive frame; and the duration of the discard timer corresponding to the intra-frame is greater than the duration of the discard timer corresponding to the bi-directional interpolated prediction frame.

6. The communication device according to claim 5, wherein the processor is specifically configured to:
   discard the PDCP SDU or the data unit generated based on the PDCP SDU when the discard timer expires.

7. The communication device according to claim 5, wherein the data unit generated based on the PDCP SDU comprises:
   a packet data convergence protocol protocol data unit (PDCP DU) formed based on the PDCP SDU, or a radio link layer control protocol service data unit (RLCP SDU) which has not started to be mapped to the radio link layer control protocol data unit RLC PDU.

8. The communication device according to claim 5, wherein the communication device comprises a terminal device, and the transceiver is configured to:
   receive a plurality of durations sent by a network device before determining the duration of the discard timer according to the type of the PDCP SDU by the determining unit; and
   the processor is specifically configured to determine a duration of the discard timer in the plurality of durations according to the type of the PDCP SDU.

9. A non-transitory computer readable storage medium that stores a program which, when executed by a processor of a communication device, causes the communication device to perform:
   determine a type of a packet data convergence protocol service data unit (PDCP SDU);
   determine a duration of a discard timer according to the type of the PDCP SDU; and
   process the PDCP SDU or a data unit generated based on the PDCP SDU according to the discard timer,
   wherein the type of the PDCP SDU comprises a type of a frame of the PDCP SDU or a service type of the PDCP SDU,
   wherein the type of the frame comprises any one of the following: an intra-frame, a forward predictive frame, and a bi-directional interpolated prediction frame, and wherein the duration of the discard timer corresponding to the intra-frame is greater than the duration of the discard timer corresponding to the forward predictive frame; and the duration of the discard timer corresponding to the intra-frame is greater than the duration of the discard timer corresponding to the bi-directional interpolated prediction frame.

10. The non-transitory computer readable storage medium according to claim 9, wherein the communication device is caused to perform:
   discard the PDCP SDU or the data unit generated based on the PDCP SDU when the discard timer expires.

11. The non-transitory computer readable storage medium according to claim 9, wherein the data unit generated based on the PDCP SDU comprises: a packet data convergence protocol data unit (PDCP DU) formed based on the PDCP SDU, or a radio link layer control protocol service data unit (RLCP SDU) which has not started to be mapped to the radio link layer control protocol protocol data unit RLC PDU.

* * * * *